United States Patent
Zhang

(10) Patent No.: US 10,623,279 B2
(45) Date of Patent: Apr. 14, 2020

(54) METHOD AND NETWORK ENTITY FOR CONTROL OF VALUE ADDED SERVICE (VAS)

(71) Applicant: Telefonaktiebolaget LM Ericsson (publ), Stockholm (SE)

(72) Inventor: Shunliang Zhang, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 145 days.

(21) Appl. No.: 15/569,291

(22) PCT Filed: May 5, 2015

(86) PCT No.: PCT/CN2015/078261
§ 371 (c)(1),
(2) Date: Oct. 25, 2017

(87) PCT Pub. No.: WO2016/176819
PCT Pub. Date: Nov. 10, 2016

(65) Prior Publication Data
US 2018/0123913 A1    May 3, 2018

(51) Int. Cl.
*G06F 15/173* (2006.01)
*H04L 12/24* (2006.01)
(Continued)

(52) U.S. Cl.
CPC .......... *H04L 41/5041* (2013.01); *H04L 12/14* (2013.01); *H04L 12/1407* (2013.01);
(Continued)

(58) Field of Classification Search
USPC .......... 709/223, 202, 205, 226, 224
See application file for complete search history.

(56) References Cited

U.S. PATENT DOCUMENTS

| 2003/0074286 | A1 | 4/2003 | Rodrigo |
| 2014/0098671 | A1* | 4/2014 | Raleigh ................ H04L 69/14 370/235 |

(Continued)

FOREIGN PATENT DOCUMENTS

| CN | 103391504 A1 | 7/2013 |
| EP | 2579506 A1 | 4/2013 |
| WO | 02 052834 A1 | 7/2002 |

OTHER PUBLICATIONS

PCT Notification of Transmittal of the International Search Report and the Written Opinion of the International Searching Authority, or the Declaration for International application No. PCT/CN2015/078261—dated Feb. 3, 2016.

(Continued)

*Primary Examiner* — Lan Dai T Truong
(74) *Attorney, Agent, or Firm* — Patent Portfolio Builders, PLLC

(57) ABSTRACT

The present disclosure provides a method (200) in a network entity for control of a Value Added Service (VAS) to be provided for a user. The method (200) comprises: receiving (S210) from another network entity an indication of an account status of a VAS related account associated with the user; determining (S220) a VAS control policy for the VAS based on the account status; and transmitting (S230) the VAS control policy to a network controller that controls provision of the VAS.

24 Claims, 5 Drawing Sheets

(51) Int. Cl.
*H04L 12/14* (2006.01)
*H04M 17/00* (2006.01)
*H04M 15/00* (2006.01)
*H04W 4/24* (2018.01)
*H04M 17/02* (2006.01)
*H04M 15/02* (2006.01)

(52) U.S. Cl.
CPC ...... *H04L 12/1417* (2013.01); *H04L 12/1435* (2013.01); *H04L 12/1457* (2013.01); *H04L 12/1467* (2013.01); *H04L 41/0893* (2013.01); *H04M 15/00* (2013.01); *H04M 15/64* (2013.01); *H04M 15/66* (2013.01); *H04M 15/68* (2013.01); *H04M 15/765* (2013.01); *H04M 15/77* (2013.01); *H04M 15/772* (2013.01); *H04M 15/835* (2013.01); *H04M 15/8356* (2013.01); *H04M 15/84* (2013.01); *H04M 15/85* (2013.01); *H04M 15/852* (2013.01); *H04M 15/854* (2013.01); *H04M 15/88* (2013.01); *H04M 15/883* (2013.01); *H04M 15/887* (2013.01); *H04M 15/888* (2013.01); *H04M 17/00* (2013.01); *H04M 17/02* (2013.01); *H04M 17/10* (2013.01); *H04W 4/24* (2013.01)

(56) References Cited

U.S. PATENT DOCUMENTS

| | | |
|---|---|---|
| 2015/0011182 A1 | 1/2015 | Goldner et al. |
| 2015/0087262 A1* | 3/2015 | Wu .................. H04W 4/24 455/408 |
| 2015/0223042 A1* | 8/2015 | Li .................... H04W 4/24 455/406 |
| 2017/0019424 A1* | 1/2017 | Rodrigues De Moura Leitao ...... H04L 63/08 |
| 2017/0244842 A1* | 8/2017 | Jung ................. H04W 4/24 |

OTHER PUBLICATIONS

Extended European Search Report issued in application No. 15891071.1; dated Nov. 22, 2018; 12 pages.

\* cited by examiner

METHOD AND NETWORK ENTITY FOR CONTROL OF VALUE ADDED SERVICE (VAS)

PRIORITY

This nonprovisional application is a U.S. National Stage Filing under 35 U.S.C. § 371 of International Patent Application Serial No. PCT/CN2015/078261 filed May 5, 2015, and entitled "Method And Network Entity For Control Of Value Added Service (VAS)."

TECHNICAL FIELD

The present disclosure relates to communication technology, and more particularly, to a method and a network entity for control of Value Added Service (VAS).

BACKGROUND

With quick development of various smart phone applications and Machine to Machine (M2M) applications, mobile network operators are becoming "pipe" providers and try to provide users with various Value Added Services (VASs), such as security protection, anti-advertisement service, video optimization/acceleration, web cache/Content Distribution Network (CDN), Hyper Text Transfer Protocol (HTTP) header enrichment and Transmission Control Protocol (TCP)/HTTP optimization.

Conventionally, a network operator can provide a package of VASs to a user based on the user's subscription to the operator and/or the operator's operation policies. For example, in order to provide two VASs, security protection and video acceleration, to user traffic of a user, the user traffic can be routed through two VAS servers (or VAS enablers), one for security protection and the other for video acceleration. Here, each VAS server can apply one or more VASs to the traffic passing through it.

Typically, such package of VASs is static. The routing topology, i.e., the VAS servers through which the user traffic is to be routed, is also static. It is thus difficult for the network operator to dynamically adjust the package to be provided to the user. For example, from the business perspective, the network operator may desire to adjust the package flexibly based on the user's payment ability or any other constraints on the user's subscription.

There is thus a need for an improved control of VAS provision.

SUMMARY

It is an object of the present disclosure to provide a method and a network entity for control of VAS, capable of allowing a network operator to provide VAS to a user in a dynamic and flexible manner.

In a first aspect, a method in a network entity for control of a Value Added Service (VAS) to be provided for a user is provided. The method comprises: receiving from another network entity an indication of an account status of a VAS related account associated with the user; determining a VAS control policy for the VAS based on the account status; and transmitting the VAS control policy to a network controller that controls provision of the VAS.

In an embodiment, the VAS control policy requires the network controller to prohibit providing the VAS for the user when the account status indicates that a balance in the VAS related account is smaller than or equal to a first threshold.

In an embodiment, the VAS control policy requires the network controller to restrict the VAS for the user when the account status indicates that the balance in the VAS related account is smaller than or equal to a second threshold but larger than the first threshold.

In an embodiment, the VAS related account comprises at least one of a common VAS account provided for all VASs available to the user and/or a VAS-specific account provided for the VAS.

In an embodiment, the VAS control policy requires the network controller to prohibit or restrict the VAS for the user when the account status indicates that a VAS quota in the VAS related account has been consumed.

In an embodiment, the method further comprises: receiving from said another network entity an indication of an overall account status of an overall account associated with the user. The VAS control policy is determined further based on the overall account status.

In an embodiment, the VAS control policy requires the network controller to provide the VAS for the user when the overall account status indicates that an overall balance in the overall account is larger than a third threshold.

In an embodiment, the other network entity is an Online Charging System (OCS) entity.

In an embodiment, the other network entity is a Policy and Charging Rules Function (PCRF) entity that receives the indication from an Online Charging System (OCS) entity.

In an embodiment, the method further comprises: receiving from the PCRF entity a recommended VAS control policy. The VAS control policy is determined further based on the recommended VAS control policy.

In an embodiment, the network entity is a Service Chaining Controller Function (SCCF) entity.

In an embodiment, the indication is received on an event-triggered or periodical basis.

In a second aspect, a network entity for control of a Value Added Service (VAS) to be provided for a user is provided. The network entity comprises: a receiving unit configured to receive from another network entity an indication of an account status of a VAS related account associated with the user; a determining unit configured to determine a VAS control policy for the VAS based on the account status; a transmitting unit configured to transmit the VAS control policy to a network controller that controls provision of the VAS.

The above embodiments of the first aspect are also applicable for the second aspect.

With the embodiments of the disclosure, a VAS related account is introduced. An indication of an account status of the VAS related account can be received and a VAS control policy can be determined for a VAS based on the account status and transmitted to a network controller that controls provision of the VAS. In this way, it is possible to monitor the account status of the VAS related account and, accordingly, control or adjust the provision of the VAS in a dynamic and flexible manner.

BRIEF DESCRIPTION OF THE DRAWINGS

The above and other objects, features and advantages will be more apparent from the following description of embodiments with reference to the figures, in which.

DETAILED DESCRIPTION

The embodiments of the disclosure will be detailed below with reference to the drawings. It should be noted that the following embodiments are illustrative only, rather than limiting the scope of the disclosure.

Before describing the embodiments of the present disclosure, the Defined Network (SDN) technique, which has recently been proposed, will be briefly introduced. The SDN technique provides open interfaces enabling upper layer application to control the connectivity provided by a set of network resources and the flow of network traffic though them, along with possible inspection and modification of traffic that may be performed in the network. The SDN architecture is described in the Open Networking Foundation (ONF) white paper "*Software-Defined Networking: The New Norm for Networks*", which is available at https://www.opennetworking.org/images/stories/downloads/sdn-resources/white-papers/wp-sdn-newnorm.pdf. In the SDN architecture, an SDN Controller (SDNC) receives requirements from upper layer applications, translates these requirements and exerts low-level control over SDN data paths.

Figure 1:
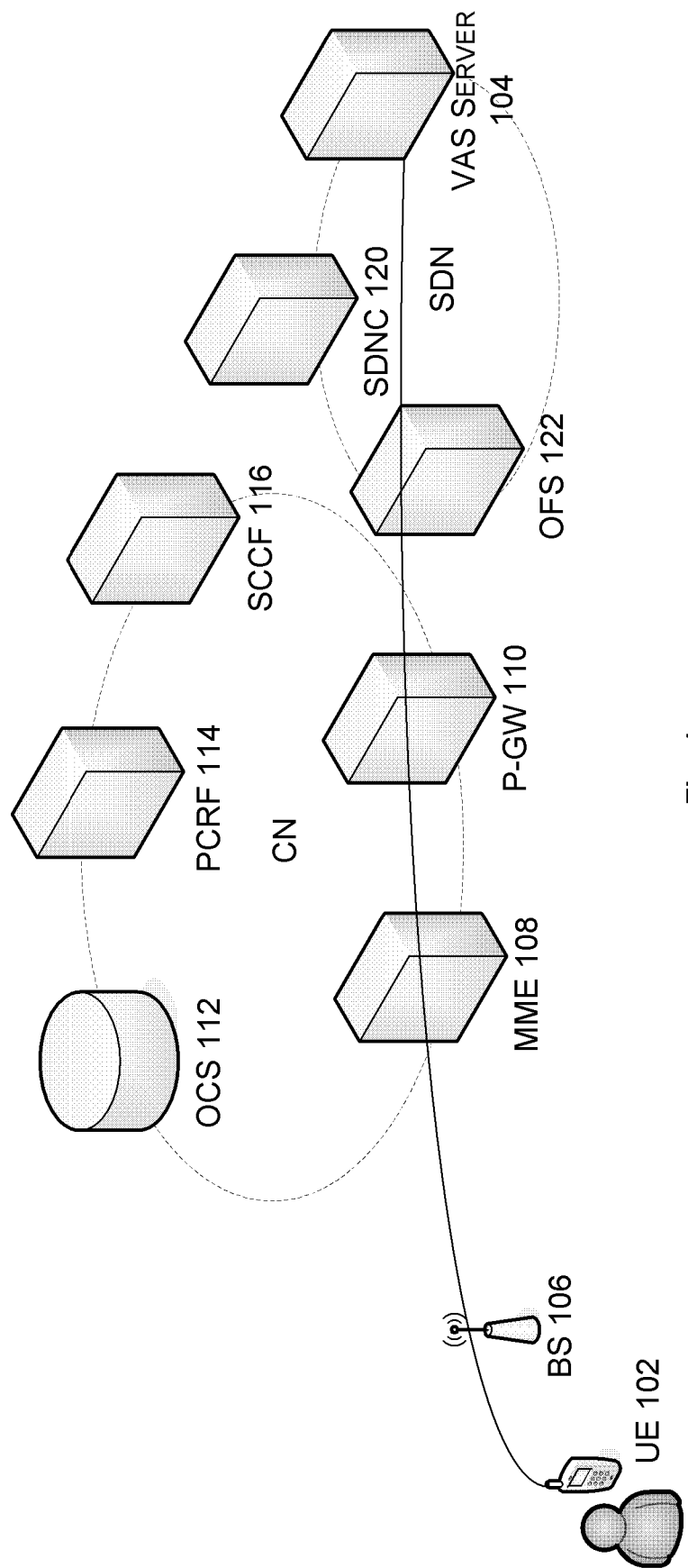
FIG. 1 is a schematic diagram showing an overview of an exemplary network environment where the present disclosure can be applied.

The inventors have realized that the SDN technique can be used with the present disclosure. FIG. 1 is a schematic diagram showing an overview of an exemplary network environment where the SDN technique is used.

FIG. 1 shows a data path of user traffic from a User Equipment (UE) 102, via an Access Network (AN) (including a Base Station (BS) 106) and a Core Network (CN) (including a Mobility Management Entity (MME) 108 and a Packet Data Network Gateway (P-GW) 110) of a network operator, to a VAS server 104 in an SDN controlled by an SDNC 120. The SDNC 120 controls routing of the user traffic in the SDN by providing an Open Flow (OF) configuration to the Open Flow Switch (OFS) 122. The CN can further include an Online Charging System (OCS) 112 for monitoring and providing charging information related to the user, e.g., information on a balance in the user's account; a Policy and Charging Rules Function (PCRF) entity 114 for policy and charging control; and a Service Chaining Controller Function (SCCF) entity 116 connected to the SDNC 120 and serving as an interface between the CN and the SDN. The operations of these network entities will be described below in detail.

Figure 2:
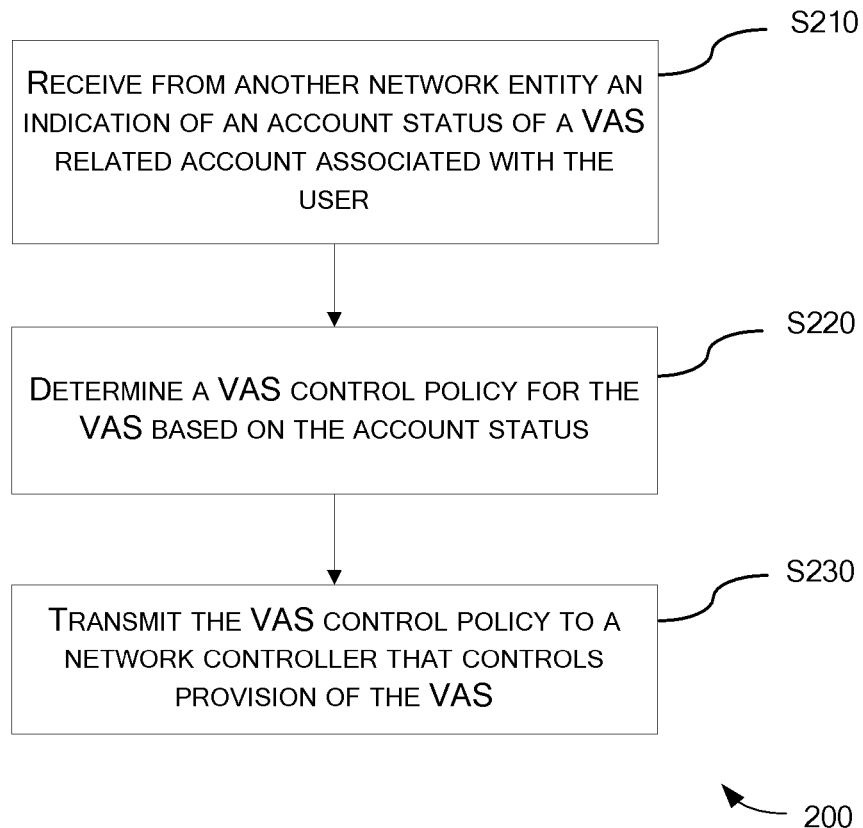
FIG. 2 is a flowchart illustrating a method for control of VAS according to an embodiment of the present disclosure.

FIG. 2 is a flowchart illustrating a method 200 for control of a VAS (e.g., security protection or video acceleration) to be provided to a user according to an embodiment of the present disclosure. The method 200 can be performed at a network entity for VAS control, e.g., the SCCF entity 116 of FIG. 1.

The method 200 includes the following steps.

At step S210, an indication of an account status of a VAS related account associated with the user is received from another network entity, which can be e.g., the OCS 112 or the PCRF entity 114 in FIG. 1.

Here, the indication can be received on an event-triggered basis. For example, the OCS 112 may transmit the indication of the account status to the SCCF entity 116 each time a balance or quota left in the VAS related account falls below a particular threshold. Alternatively, the indication can be received periodically. For example, the OCS 112 may transmit the indication of the account status to the SCCF entity 116 every 10 minutes.

In the example where the indication is received from the PCRF entity 114, the PCRF entity 114 may serve as an interface between the OCS 112 and the SCCF entity 116. That is, the PCRF entity 114 receives the indication from the OCS 112 and forwards it to the SCCF entity 116.

In an example, the VAS related account can be a common VAS account provided for all VASs available to the user (e.g., two or more VASs can share the same common VAS account) and/or a VAS-specific account provided for the VAS (i.e., an account specific to the VAS).

At step S220, a VAS control policy for the VAS is determined based on the account status. For example, the VAS control policy may include one or more of: order of the VAS in a chain of VASs to be provided to the user; conditions to apply the policy, e.g., time, location, associated application and/or user category; identifier or Internet Protocol (IP) address of the user and possibly Public Land Mobile Network (PLMN) identifier to apply the policy; and, possibly, traffic description information, e.g., source and destination IP addresses and ports, Uniform Resource Locator (URL) and application identifier.

At step S230, the VAS control policy is transmitted to a network controller that controls provision of the VAS. Here, the network controller can be e.g., the SDNC 120 in FIG. 1, which controls routing of the user traffic of the user in the SDN including at least a VAS server providing the VAS.

In an example, when the account status indicates that a balance in the VAS related account is smaller than or equal to a first threshold, the VAS control policy requires the network controller to prohibit providing the VAS for the user. For example, when the balance, $B_{VAS}$, in the common VAS account or the VAS-specific account is smaller than the first threshold, $TH_1$, i.e., $B_{VAS}<=TH_1$, the VAS control policy determined in the step S220 may require the network controller to prohibit providing the VAS for the user, e.g., by sending an OF configuration to the OFS 122 that prohibits routing the user traffic through the VAS server.

In another example, when the account status indicates that the balance in the VAS related account is smaller than or equal to a second threshold but larger than the first threshold, the VAS control policy requires the network controller to restrict the VAS for the user. For example, when the balance, $B_{VAS}$, in the common VAS account or the VAS-specific account is smaller than or equal to the second threshold, $TH_2$, but larger than the first threshold, $TH_1$, i.e., $TH_1<B_{VAS}<=TH_2$, the VAS control policy determined in the step S220 may require the network controller to restrict the VAS for the user, e.g., by sending an OF configuration to the OFS 122 that routes only a fraction of the user traffic through the VAS server.

Accordingly, when $B_{VAS}>TH_2$, the VAS control policy determined in the step S220 may require the network controller to provide the VAS for the user without any restriction.

In an example, when the account status indicates that a VAS quota in the VAS related account has been consumed, the VAS control policy requires the network controller to prohibit or restrict the VAS for the user. For example, the VAS quota may specify that only 10 dollars can be spent on the VAS (or all VASs available to the user) per day. Alternatively, the VAS quota may specify that the VAS can be applied to only 100 MB of user traffic per day (e.g., in the case of video acceleration). In this case, if the account status indicates that the user has already spent 10 dollars on the VAS this day, or that the VAS has been applied to 100 MB of user traffic this day, the VAS control policy determined in the step S220 may require the network controller to prohibit or restrict the VAS for the user.

Optionally, the method 200 may further include a step of receiving from the other network entity an indication of an overall account status of an overall account associated with the user. In this case, in the step S220, the VAS control policy can be determined further based on the overall account status.

In an example, when the overall account status indicates that an overall balance, $B_O$, in the overall account is larger than or equal to a third threshold, $TH_3$, i.e., $B_O>=TH_3$, the VAS control policy requires the network controller to provide the VAS for the user. For example, even if $B_{VAS}<=TH_1$ or $TH_1<B_{VAS}<=TH_2$, the VAS control policy determined in the step S220 may require the network controller to provide the VAS for the user as long as $B_O>=TH_3$.

Optionally, in the example where the indication is received from the PCRF entity 114, a recommended VAS control policy can also be received from the PCRF entity 114. In this case, in the step S220, the VAS control policy can be determined further based on the recommended VAS control policy. For example, the PCRF entity 114 may analyze the indication received from the OCS 112 and provide its recommended VAS control policy to the SCCF entity 116. The recommended VAS control policy may suggest, providing, prohibiting or restricting the VAS for the user.

Figure 3:
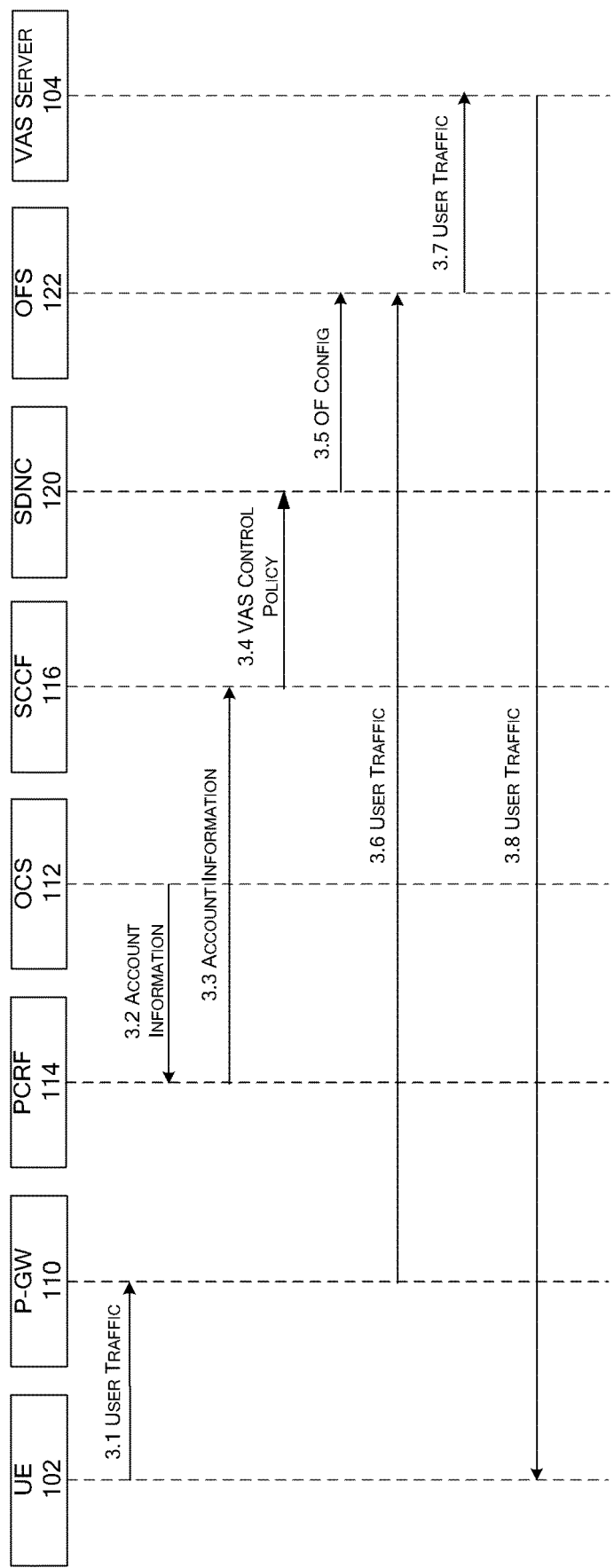
FIG. 3 is a sequence chart explaining a first implementation of the method shown in FIG. 2.

In the following, the above method 200 will be further explained with reference to FIGS. 3 and 4. FIG. 3 is a sequence chart explaining a first implementation of the method 200.

As shown in FIG. 3, at 3.1, the UE 102 sends user traffic (e.g., in an HTTP Request message) to the P-GW 110 (via AN and CN nodes not shown in FIG. 3). Then, a Policy and Charging Enforcement Function (PCEF) entity collocated with the P-GW 110 will exchange signaling messages associated with Quality of Service (QoS) and charging policies with the PCRF entity 114, which is not shown in FIG. 3 and further details thereof will be omitted here. At 3.2, the OCS 112, which monitors the charging information of the user, sends account information (indicating account status of a VAS related account and/or overall account of the user) to the PCRF entity 114, on either event-triggered or periodical basis. At 3.3, the PCRF entity 114 forwards the account information to the SCCF entity 116, possibly with a recommended VAS control policy derived from the account information. Then, the SCCF entity 116 determines the VAS control policy based on the account information (and optionally the recommended VAS control policy from the PCRF entity 114) and sends it to the SDNC 120 at 3.4. The SDNC 120 translates the VAS control policy into an OF configuration and sends it to the OFS 122 at 3.5. Then, upon receiving the user traffic at 3.6, at 3.7 the OFS 122 routes the user traffic to the VAS server 104 where the VAS is applied to the user traffic. Finally at 3.8, the user traffic is sent back to the UE 102.

Figure 4:
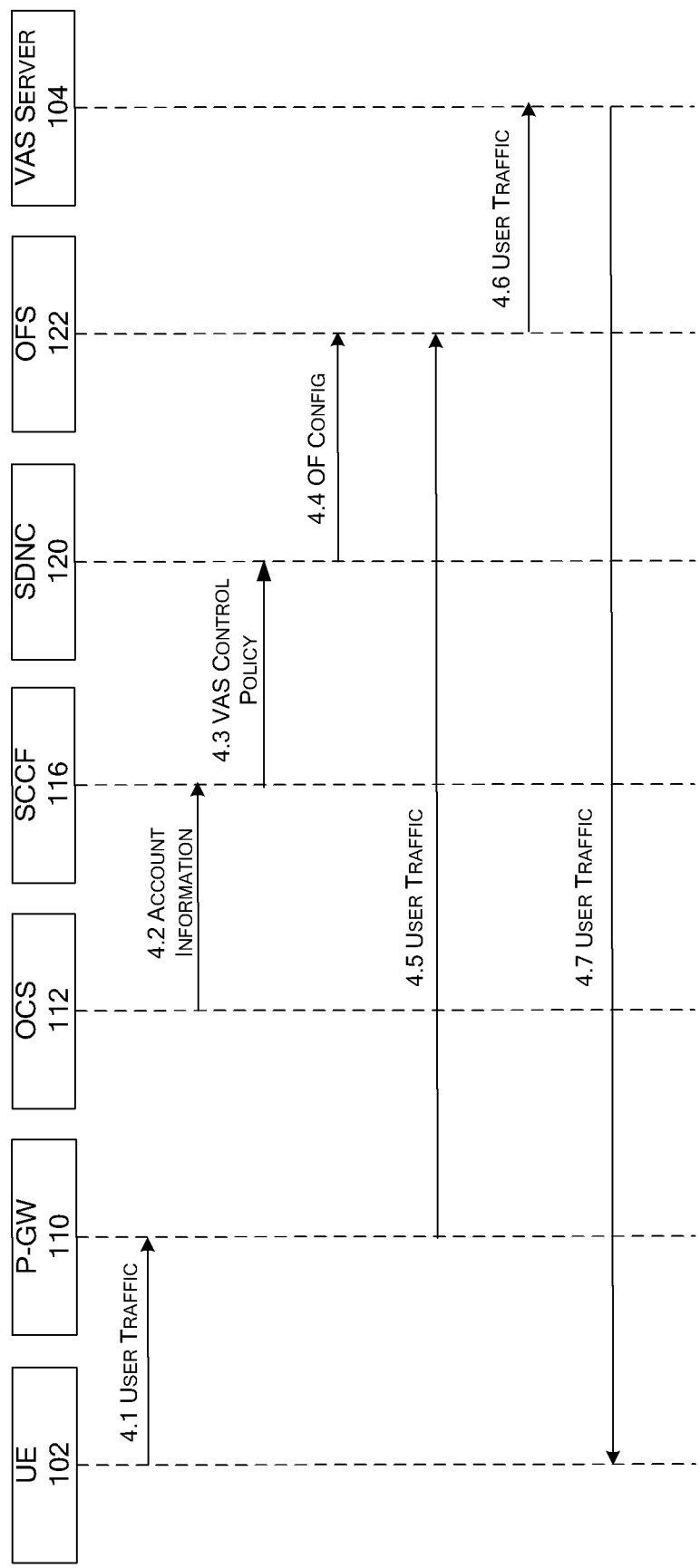
FIG. 4 is a sequence chart explaining a second implementation of the method shown in FIG. 2.

FIG. 4 is a sequence chart explaining a second implementation of the method 200.

As shown in FIG. 4, at 4.1, the UE 102 sends user traffic (e.g., in an HTTP Request message) to the P-GW 110 (via AN and CN nodes not shown in FIG. 4). Then, a PCEF entity collocated with the P-GW 110 will exchange signaling messages associated with QoS and charging policies with the PCRF entity 114, which is not shown in FIG. 4 and further details thereof will be omitted here. At 4.2, the OCS 112, which monitors the charging information of the user, sends account information (indicating account status of a VAS related account and/or overall account of the user) to the SCCF entity 116. Then, the SCCF entity 116 determines the VAS control policy based on the account information and sends it to the SDNC 120 at 4.3. The SDNC 120 translates the VAS control policy into an OF configuration and sends it to the OFS 122 at 4.4. Then, upon receiving the user traffic at 4.5, at 4.6 the OFS 122 routes the user traffic to the VAS server 104 where the VAS is applied to the user traffic. Finally at 4.7, the user traffic is sent back to the UE 102.

Figure 5:
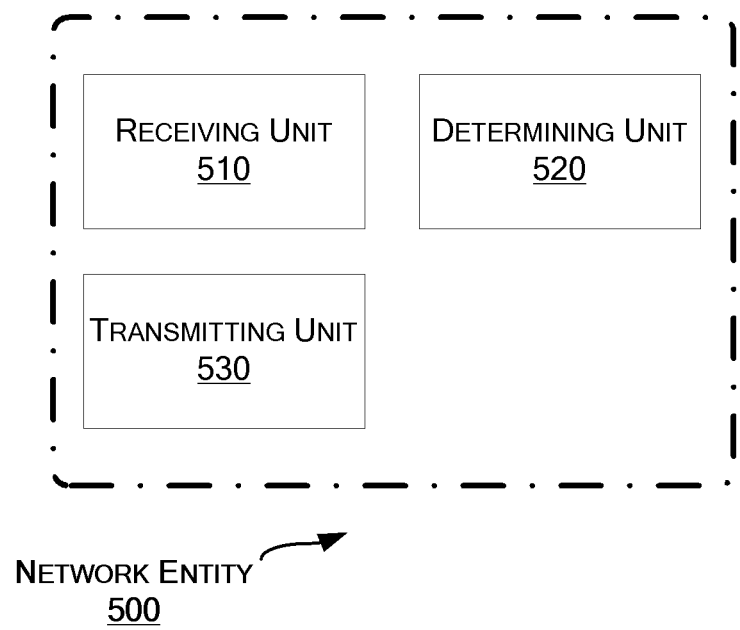
FIG. 5 is a block diagram of a network entity for control of VAS according to an embodiment of the present disclosure.

Correspondingly to the method 200 as described above, a network entity is provided. FIG. 5 is a block diagram of a network entity 500 for control of a VAS to be provided for a user according to an embodiment of the present disclosure. The network entity 500 can be e.g., the SCCF entity 116 in FIG. 1.

As shown in FIG. 5, the network entity 500 includes a receiving unit 510 configured to receive from another network entity an indication of an account status of a VAS related account associated with the user. The network entity 500 further includes a determining unit 520 configured to determine a VAS control policy for the VAS based on the account status. The network entity 500 further includes a transmitting unit 530 configured to transmit the VAS control policy to a network controller that controls provision of the VAS.

In an embodiment, the VAS control policy requires the network controller to prohibit providing the VAS for the user when the account status indicates that a balance in the VAS related account is smaller than or equal to a first threshold.

In an embodiment, the VAS control policy requires the network controller to restrict the VAS for the user when the account status indicates that the balance in the VAS related account is smaller than or equal to a second threshold but larger than the first threshold.

In an embodiment, the VAS related account comprises at least one of a common VAS account provided for all VASs available to the user and a VAS-specific account provided for the VAS.

In an embodiment, the VAS control policy requires the network controller to prohibit or restrict the VAS for the user when the account status indicates that a VAS quota in the VAS related account has been consumed.

In an embodiment, the receiving unit 510 is further configured to receive from said another network entity an indication of an overall account status of an overall account associated with the user. The determining unit 520 is configured to determining the VAS control policy further based on the overall account status.

In an embodiment, the VAS control policy requires the network controller to provide the VAS for the user when the overall account status indicates that an overall balance in the overall account is larger than a third threshold.

In an embodiment, the other network entity is an Online Charging System (OCS) entity.

In an embodiment, the other network entity is a Policy and Charging Rules Function (PCRF) entity that receives the indication from an Online Charging System (OCS) entity.

In an embodiment, the receiving unit 510 is further configured to receive from the PCRF entity a recommended VAS control policy. The determining unit 520 is configured to determine the VAS control policy further based on the recommended VAS control policy.

In an embodiment, the network entity 500 is a Service Chaining Controller Function (SCCF) entity.

In an embodiment, the receiving unit 510 is configured to receive the indication on an event-triggered or periodical basis.

Each of the units 510-530 can be implemented as a pure hardware solution or as a combination of software and hardware, e.g., by one or more of: a processor or a micro processor and adequate software and memory for storing of the software, a Programmable Logic Device (PLD) or other electronic component(s) or processing circuitry configured to perform the actions described above, and illustrated, e.g., in FIG. 2.

Figure 6:
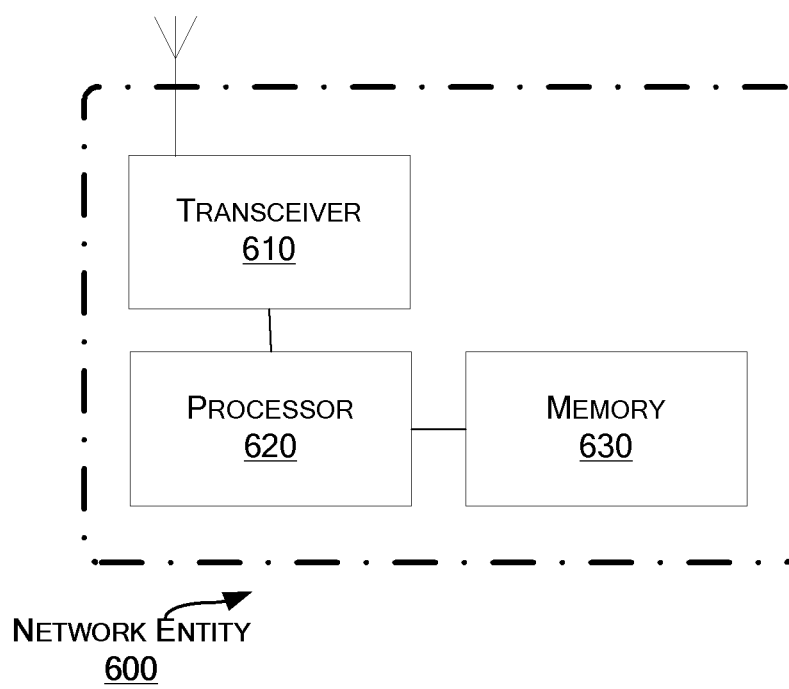
FIG. 6 is a block diagram of a network entity according to another embodiment of the present disclosure.

FIG. 6 is a block diagram of a network entity 600 according to another embodiment of the present disclosure.

The network entity 600 can be provided for control of a Value Added Service (VAS) to be provided for a user. The network entity 600 includes a transceiver 610, a processor 620 and a memory 630. The memory 630 contains instructions executable by the processor 620 whereby the network entity 600 is operative to: receive from another network entity an indication of an account status of a VAS related account associated with the user; determine a VAS control policy for the VAS based on the account status; and transmit the VAS control policy to a network controller that controls provision of the VAS.

The present disclosure also provides at least one computer program product in the form of a non-volatile or volatile memory, e.g., an Electrically Erasable Programmable Read-Only Memory (EEPROM), a flash memory and a hard drive. The computer program product includes a computer program. The computer program includes: code/computer readable instructions, which when executed by the processor 620 causes the network entity 600 to perform the actions, e.g., of the procedure described earlier in conjunction with FIG. 2.

The computer program product may be configured as a computer program code structured in computer program modules. The computer program modules could essentially perform the actions of the flow illustrated in FIG. 2.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a network entity for control of a Value Added Service (VAS) to be provided for a user, the method comprising:
    receiving, from another network entity, an indication of an account status of a VAS related account associated with the user;
    determining a VAS control policy for the VAS based on the account status, wherein the account status corresponds to a balance or a VAS quota in the VAS related account; and
    transmitting the VAS control policy to a network controller that controls provision of the VAS.

2. The method of claim 1, wherein the VAS control policy requires the network controller to prohibit providing the VAS for the user when the account status indicates that the balance in the VAS related account is smaller than or equal to a first threshold.

3. The method of claim 2, wherein the VAS control policy requires the network controller to restrict the VAS for the user when the account status indicates that the balance in the VAS related account is smaller than or equal to a second threshold but larger than the first threshold.

4. The method of claim 1, wherein the VAS related account comprises at least one of a common VAS account provided for all VASs available to the user and a VAS-specific account provided for the VAS.

5. The method of claim 1, wherein the VAS control policy requires the network controller to prohibit or restrict the VAS for the user when the account status indicates that the VAS quota in the VAS related account has been consumed.

6. The method of claim 1, further comprising:
    receiving from said another network entity, an indication of an overall account status of an overall account associated with the user,
    wherein the VAS control policy is determined further based on the overall account status.

7. The method of claim 6, wherein the VAS control policy requires the network controller to provide the VAS for the user when the overall account status indicates that an overall balance is larger than a threshold.

8. The method of claim 1, wherein said another network entity is an Online Charging System (OCS) entity.

9. The method of claim 1, wherein said another network entity is a Policy and Charging Rules Function (PCRF) entity that receives the indication from an Online Charging System (OCS) entity.

10. The method of claim 9, further comprising:
    receiving from the PCRF entity a recommended VAS control policy,
    wherein the VAS control policy is determined further based on the recommended VAS control policy.

11. The method of claim 1, wherein the network entity is a Service Chaining Controller Function (SCCF) entity.

12. The method of claim 1, wherein the indication is received on an event-triggered or periodical basis.

13. A network entity for control of a Value Added Service (VAS) to be provided for a user, the network entity comprising one or more processors configured to:
    Receive, from another network entity, an indication of an account status of a VAS related account associated with the user;
    determine a VAS control policy for the VAS based on the account status, wherein the account status corresponds to a balance or a VAS quota in the VAS related account; and
    transmit the VAS control policy to a network controller that controls provision of the VAS.

14. The network entity of claim 13, wherein the VAS control policy requires the network controller to prohibit providing the VAS for the user when the account status indicates that the balance in the VAS related account is smaller than or equal to a first threshold.

15. The network entity of claim 14, wherein the VAS control policy requires the network controller to restrict the VAS for the user when the account status indicates that the balance in the VAS related account is smaller than or equal to a second threshold but larger than the first threshold.

16. The network entity of claim 13, wherein the VAS related account comprises at least one of a common VAS account provided for all VASs available to the user and a VAS-specific account provided for the VAS.

17. The network entity of claim 13, wherein the VAS control policy requires the network controller to prohibit or restrict the VAS for the user when the account status indicates that the VAS quota in the VAS related account has been consumed.

18. The network entity of claim 13, wherein the one or more processors are further configured to receive, from said another network entity, an indication of an overall account status of an overall account associated with the user, and
wherein the one or more processors are configured to determine the VAS control policy further based on the overall account status.

19. The network entity of claim 18, wherein the VAS control policy requires the network controller to provide the VAS for the user when the overall account status indicates that an overall balance in the overall account is larger than a threshold.

20. The network entity of claim 13, wherein said another network entity is an Online Charging System (OCS) entity.

21. The network entity of claim 13, wherein said another network entity is a Policy and Charging Rules Function (PCRF) entity that receives the indication from an Online Charging System (OCS) entity.

22. The network entity of claim 21, wherein the one or more processors are further configured to receive, from the PCRF entity, a recommended VAS control policy, and
wherein the one or more processors are configured to determine the VAS control policy further based on the recommended VAS control policy.

23. The network entity of claim 13, wherein the network entity is a Service Chaining Controller Function (SCCF) entity.

24. The network entity of claim 13, wherein the one or more processors are configured to receive the indication on an event-triggered or periodical basis.

* * * * *